(12) United States Patent
Reif

(10) Patent No.: US 9,730,150 B2
(45) Date of Patent: *Aug. 8, 2017

(54) METHODS AND APPARATUS FOR USE IN FACILITATING ACCESS TO AGGREGATOR SERVICES FOR MOBILE COMMUNICATION DEVICES VIA WIRELESS COMMUNICATION NETWORKS

(71) Applicant: BLACKBERRY LIMITED, Waterloo (CA)

(72) Inventor: Alexander Jordan Reif, Bonn (DE)

(73) Assignee: BLACKBERRY LIMITED, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,977

(22) Filed: Feb. 29, 2016

(65) Prior Publication Data

US 2016/0205620 A1   Jul. 14, 2016

Related U.S. Application Data

(63) Continuation of application No. 13/849,875, filed on Mar. 25, 2013, now Pat. No. 9,277,489, which is a
(Continued)

(51) Int. Cl.
*H04W 48/16* (2009.01)
*H04W 4/06* (2009.01)
(Continued)

(52) U.S. Cl.
CPC ............ *H04W 48/16* (2013.01); *H04L 63/08* (2013.01); *H04W 4/06* (2013.01); *H04W 4/185* (2013.01);
(Continued)

(58) Field of Classification Search
CPC ...................................................... H04L 63/08
See application file for complete search history.

(56) References Cited

U.S. PATENT DOCUMENTS

| | | | | |
|---|---|---|---|---|
| 7,535,880 B1 * | 5/2009 | Hinman | ................ | H04W 12/08 370/338 |
| 7,849,177 B2 * | 12/2010 | Uhlik | ...................... | H04L 12/14 709/223 |

(Continued)

OTHER PUBLICATIONS

Reif, Alexander Jordan, "Methods and Apparatus for Use in Facilitating Access to Aggregator Services for Mobile Communication Devices via Wireless Communication Networks", U.S. Appl. No. 13/849,875, filed Mar. 25, 2013.

*Primary Examiner* — Xavier Szewai Wong
(74) *Attorney, Agent, or Firm* — Perry + Currier Inc.

(57) ABSTRACT

A mobile device performs a scanning operation for identifying a wireless network and receives from the wireless network a hotspot aggregator service identifier which identifies a hotspot aggregator service made available via the wireless network. The mobile device compares the received hotspot aggregator service identifier with one or more hotspot aggregator service identifiers stored in memory. When there is a match between the received and the stored hotspot aggregator service identifiers, the mobile device initiates a connection with the wireless network for receiving the hotspot aggregator service.

20 Claims, 8 Drawing Sheets

Related U.S. Application Data continuation of application No. 12/643,061, filed on Dec. 21, 2009, now Pat. No. 8,411,604.

(51) Int. Cl.
*H04W 4/18* (2009.01)
*H04W 4/24* (2009.01)
*H04W 12/06* (2009.01)
*H04W 48/18* (2009.01)
*H04L 29/06* (2006.01)
*H04W 84/12* (2009.01)
*H04W 88/02* (2009.01)

(52) U.S. Cl.
CPC ............ *H04W 4/24* (2013.01); *H04W 12/06* (2013.01); *H04W 48/18* (2013.01); *H04W 84/12* (2013.01); *H04W 88/02* (2013.01)

(56) References Cited

U.S. PATENT DOCUMENTS

| | | | |
|---|---|---|---|
| 8,411,604 B2* | 4/2013 | Reif | H04W 48/16 370/310 |
| 9,107,142 B2* | 8/2015 | Leonov | H04W 4/021 |
| 9,277,489 B2* | 3/2016 | Reif | H04W 48/18 |
| 2007/0073868 A1* | 3/2007 | Nelson | H04L 63/0823 709/224 |
| 2009/0109941 A1* | 4/2009 | Carter | H04W 12/06 370/338 |
| 2009/0279492 A1* | 11/2009 | Montemurro | H04L 63/083 370/329 |

\* cited by examiner

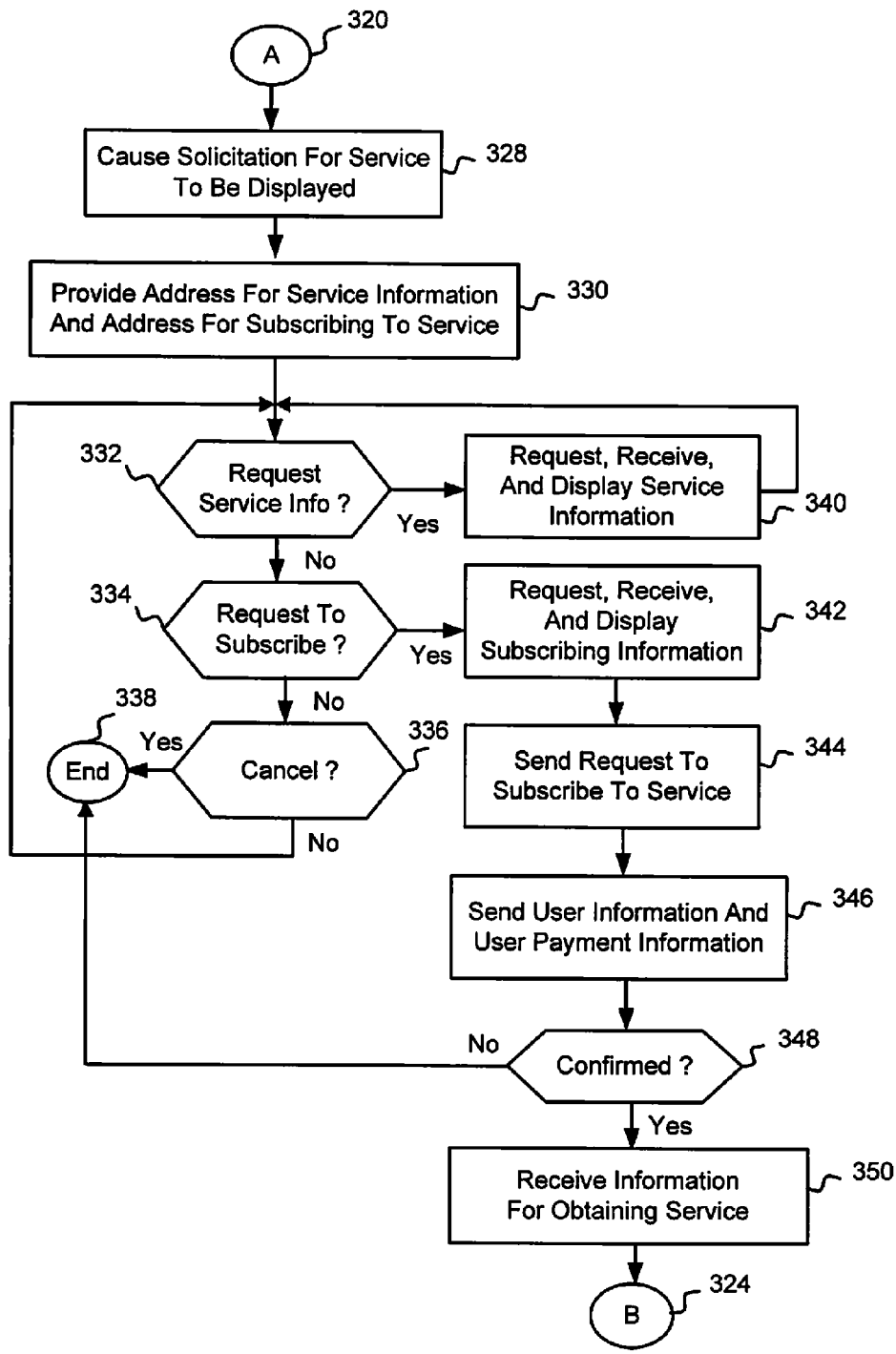

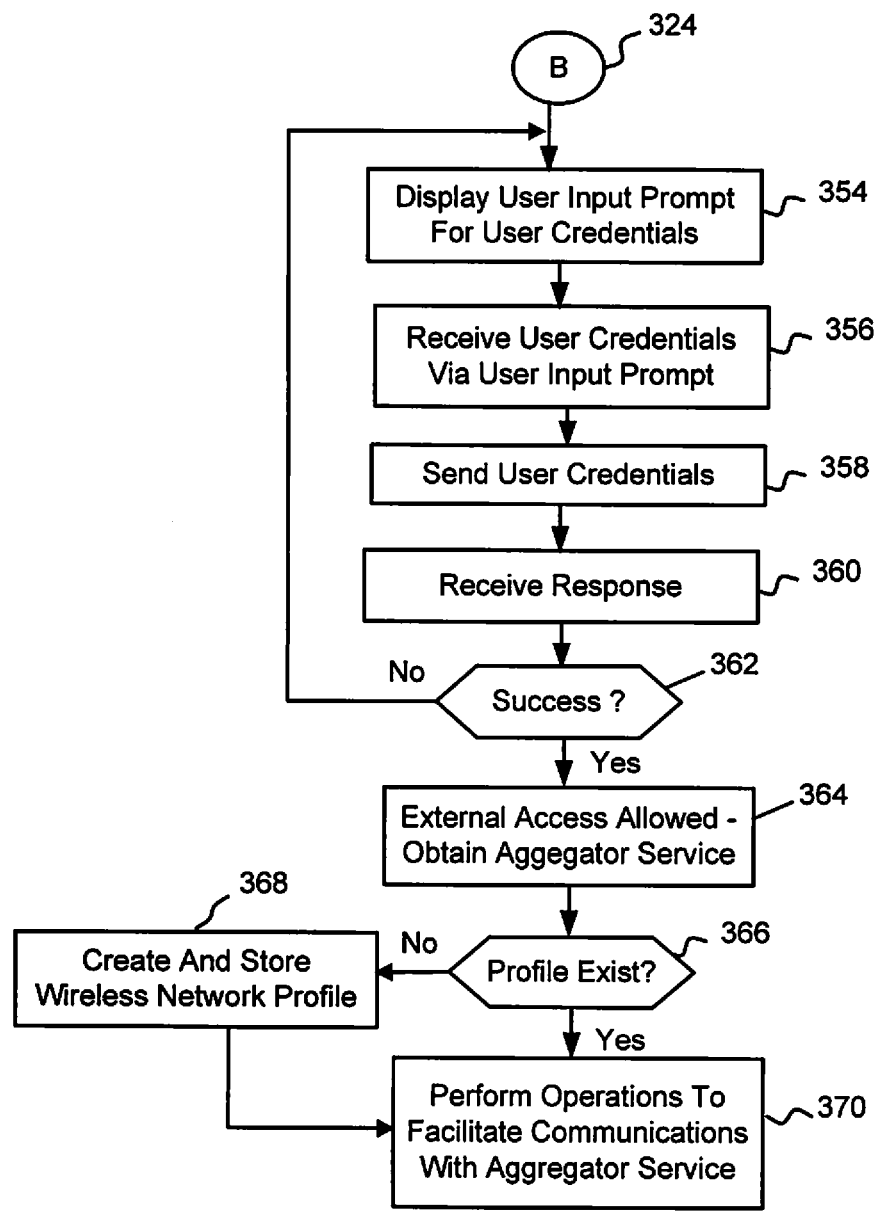

METHODS AND APPARATUS FOR USE IN FACILITATING ACCESS TO AGGREGATOR SERVICES FOR MOBILE COMMUNICATION DEVICES VIA WIRELESS COMMUNICATION NETWORKS

CROSS-REFERENCE TO RELATED APPLICATION

This application is a continuation of and claims priority to U.S. non-provisional patent application having application Ser. No. 12/643,061 and filing date of 21 Dec. 2009, which is hereby incorporated herein by reference.

BACKGROUND

Field of the Technology

The present disclosure relates generally to techniques for use in providing access to aggregator services for a mobile communication device via a wireless network, such as via a wireless local area network (WLAN) hotspot or similar environment.

Description of the Related Art

In wireless communication networks, such as wireless local area networks (WLANs) which operate in accordance with IEEE 802.11-based standards, a mobile communication device may obtain communication services. While being mobile, the mobile device may exit and enter into new and different WLANs. The new or unknown WLAN may be a WLAN "hotspot" which provides a captive portal, where a user login or other user response will be required prior to the mobile device obtaining any useful services via the hotspot.

For a laptop computer, this operation is typically acceptable since the user often merely intends to use and "surf" the Internet, interacting with the keyboard of the laptop computer to invoke a Web browser application when desired. When the Web browser application is opened, this request is detected, which causes a request for a server site to be submitted in order to receive data of a desired website. The request is typically redirected by the hotspot for user login, after which the mobile device will obtain service, assuming the authentication is positive. However, for mobile devices which are intended primarily for voice telephony (e.g. cell phones), electronic mail (e-mail) communications, and/or other "push-type" data communications, such manual login may be undesirable and may not suitable for automatic reconnection at later times.

On the other hand, the popularity of Internet access through hotspots has led to the emergence of a new kind of entity: a hotspot aggregator. A hotspot aggregator provides wireless Internet access to its customers by renting a WLAN connection to the Internet (i.e. the "hotspot") from hotspot owners, e.g. coffee shops, hotels, and airports. In contrast to an ordinary telecommunications entity, a hotspot aggregator does not (necessarily) own the access networks, but rather relies on a network of independently owned and operated access networks. Examples of current hotspot aggregators are Boingo, The Cloud, iPass, and Airpath.

One or more aggregator services may be made available in a single hotspot. In any given hotspot, some aggregator services may be made available while others may not be. Some hotspots may only employ a single Set Service Identifier (SSID), and this makes it difficult for mobile devices to identify whether any particular aggregator service is made available in the hotspot. Thus, traditionally, an aggregator provides users with client software to aid in finding and signing in for service. Locally-stored directories of hotspot locations and details have also been provided, requiring some type of network connection for updates. Note however that these existing ways of obtaining service are specific to each particular aggregator, and therefore there is little flexibility for a mobile device to be made aware of and obtain one or more of a variety of different aggregator services in an easy and efficient manner. Also, each hotpot may require a different way of logging in for access (e.g. different web sites for login).

Accordingly, what are needed are methods and apparatus which overcome these and other related deficiencies of the prior art. Other types of networks and devices may experience the same or similar deficiencies.

BRIEF DESCRIPTION OF THE DRAWINGS

Embodiments of present invention will now be described by way of example with reference to attached figures, wherein:

FIGS. 3A, 3B, and 3C form a flowchart of a method for use in facilitating access to aggregator services for mobile communication devices via the wireless communication network of FIG. 1;

DETAILED DESCRIPTION OF THE PREFERRED EMBODIMENTS

Methods and apparatus for use in facilitating access to aggregator services for mobile communication devices via wireless communication networks are described herein. In one illustrative example, a wireless local area network (WLAN) regularly broadcasts or otherwise communicates one or more aggregator service identifiers which identify one or more aggregator services made available via the WLAN. Each aggregator service identifier may be defined as a new, unique information element (IE) in IEEE 802.11 or other relevant standard. In addition, a mobile communication device has a memory for storing aggregator service information. During operation, the mobile device performs a scanning operation to identify WLANs and receives, from the scanning operation, the one or more aggregator service identifiers from the WLAN. The mobile device compares a received aggregator service identifier with one or more stored aggregator service identifiers of the aggregator service information. When there is a match between the received and the stored aggregator service identifiers, the mobile device may connect with and receive the aggregator service via the WLAN. For newly-encountered WLANs, the mobile device may also automatically create and store in memory a wireless network profile associated with the WLAN that provides the aggregator service. For each aggregator or aggregator service, the aggregator service information may include a service name of the aggregator or aggregator service, a security type for authentication, a first URL for obtaining service information for the aggregator service, and a second URL for subscribing to the aggregator service, all of which may be displayed or otherwise utilized for obtaining service.

Figure 1:
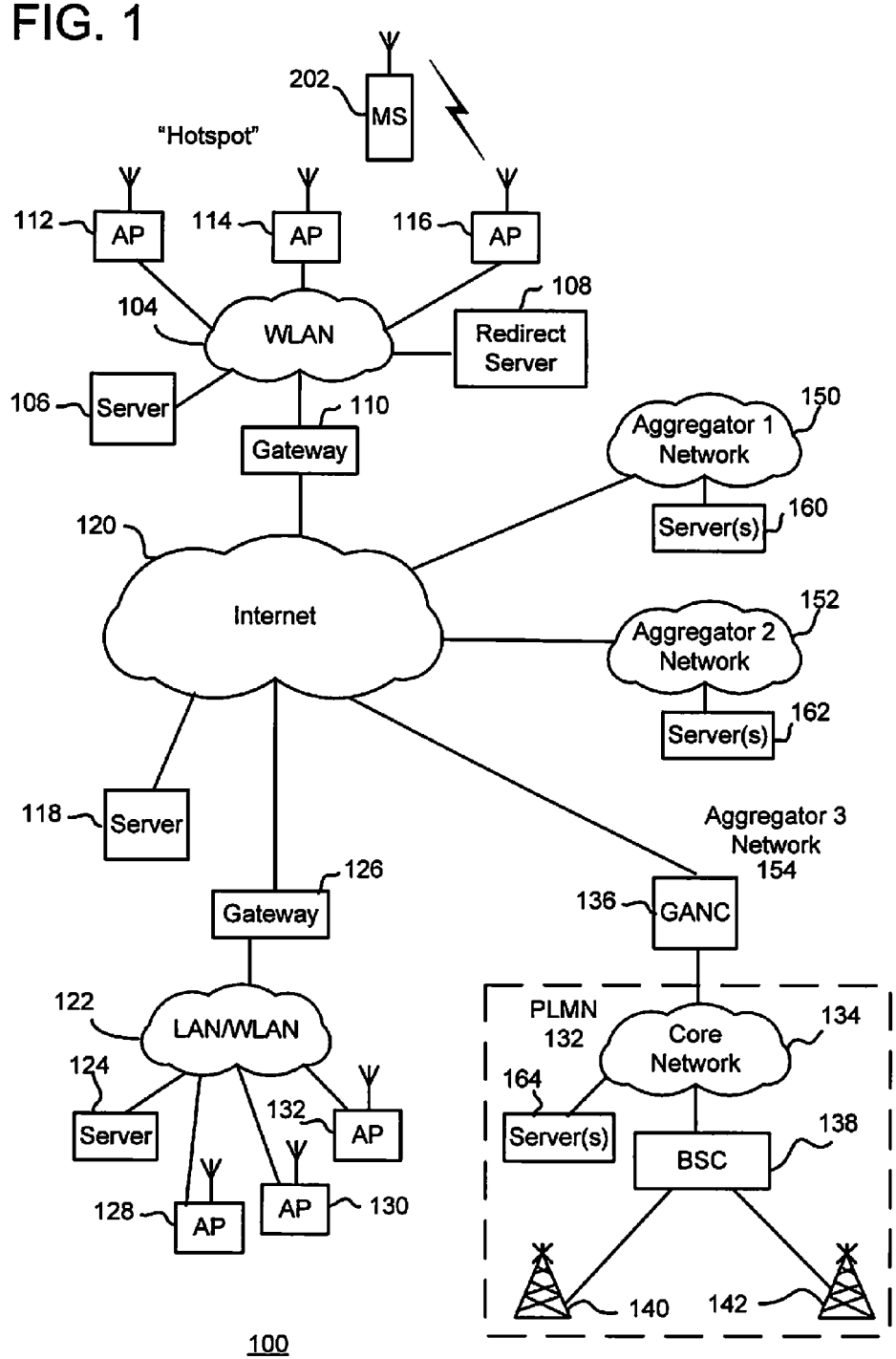
FIG. 1 is an illustrative representation of a communication system which includes a wireless communication network, such as a wireless local area network (WLAN) or WLAN "hotspot," within which a mobile communication device may operate.

To illustrate one exemplary network architecture, FIG. 1 shows a representation of a communication system 100 having a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202.

Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques. Note that some communication applications utilized by terminals, such as VoIP applications, require the use of SIP. SIP is well-documented in standard documents such as Request For Comments (RFC) 3261.

For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). The user will enter a user response via the Web browser application, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

As described earlier, the popularity of Internet access through hotspots has led to the emergence of a new kind of entity, namely, a hotspot aggregator. In general, a hotspot aggregator provides wireless Internet access to its customers by renting a WLAN connection to the Internet (i.e. a "hotspot") from hotspot owners, e.g. coffee shops, hotels, and airports. In contrast to an ordinary telecommunications entity, a hotspot aggregator does not (necessarily) own the access networks, but rather relies on a network of independently owned and operated access networks. Examples of current hotspot aggregators are Boingo, The Cloud, iPass, and Airpath.

In FIG. 1, a plurality of hotspot aggregator networks 150, 152, and 154 associated with different hotspot aggregators are shown. Each aggregator network 150, 152, and 154 is communicatively coupled to the Internet 120. For illustration, aggregator network 150 may be associated with an aggregator named "Boingo" and provide Boingo service through use of one or more servers 160; aggregator network 152 may be associated with an aggregator named "iPass" and provide iPass service through use of one or more servers 162; and aggregator network 154 may be associated with an aggregator named "T-Mobile" and provide T-Mobile service with use of one or more servers 164. Each aggregator has relationships with one or more different entities that provide wireless service access at a plurality of different hotspots or hotspot locations. Each aggregator may provide a different type of aggregator service for mobile devices; typically, however, each aggregator may offer at least Internet access via a plurality of hotspots. Servers 160, 162, and 164 may be adapted to provide or otherwise facilitate the aggregator service for the mobile devices, performing functions such as authenticating for service, monitoring service, billing functions, providing service information or subscription information, subscribing new mobile devices or users, and/or managing subscriptions and subscription information, to name a few.

One type of aggregator service may be based on Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided.

Again, GANC 136 operates in accordance with GAN based technology (formerly known as Unlicensed Mobile Access (UMA), and may be or include GANC 136 (formerly known as UMA Network Controller or UNC) or the like. In this case, terminals including mobile device 202 are enabled with GAN technology for operating in a GAN mode of operation. GAN methodologies are known and described in publicly available documentation. Mobile device 202 with GAN-enabled, dual-mode operation may be within operating range of WLAN 104 for communications. Upon connecting, mobile device 202 contacts GANC 136, via WLAN 104 and the Internet 120, to be authenticated and authorized to access voice and data communication services of core network of PLMN 132. If approved, the subscriber's current location information is stored in core network 134 of PLMN 132 and, from that point on, all voice and data traffic for mobile device 202 is routed to the device via WLAN 104, in contrast to a radio access network (RAN) of PLMN 132 which includes BSC 138 and BSs 140 and 142. In this state, mobile device 202 is operating in a GAN mode of operation. When a call is established for mobile device 202 while operating within WLAN 104, the call connection for the call is routed within core network 134 but RF resources of WLAN 104 are utilized.

In this embodiment specifically, WLAN 104 is operable as a broadband IP-based access network providing access to the well-known A/Gb interfaces of PLMN 132, wherein GANC 136 is a network node coupled to WLAN 104 via an Up reference point interface. See e.g. Third Generation Partnership Project (3GPP) Technical Specification (TS) 43.318. As provided for in such specification documents, the Up reference point defines the interface between GANC 136 and mobile device 202. Where the WLAN 104 and GANC 136 are operable to co-exist with the GSM/Enhanced Data Rates for GSM Evolution (EDGE) RAN (GERAN) infrastructure, GANC 136 interconnects to the core network 134 of PLMN 132 via the same A/Gb interfaces used by a standard GERAN Base Station Subsystem (BSS) network element. Accordingly, the functionality of GANC 136 includes necessary protocol interworking so as to emulate the functionality of the GERAN BSS. An A-interface defines the interface for GSM-based circuit-switched (CS) services and is disposed between GANC 136 and a Mobile Switching Center (MSC) of PLMN 132. A Gb-interface defines the interface for GPRS-based packet-switched (PS) services and is disposed between GANC 136 and Serving GPRS Support Node (SGSN) (not shown in FIG. 1) of PLMN 132. A Security Gateway (SGW) may also be included in GANC 136 that is interfaced via a Wm reference point with an Authentication, Authorization and Accounting (AAA) proxy/server node disposed in PLMN 132, wherein a Home Location Register (HLR) is operably coupled to AAA node.

In operation, WLAN 104 and GANC 136 appears to core network 134 of PLMN 104 as a GERAN BSS network element by mimicking the role of the BSC in the GERAN architecture as seen from the perspective of the A/Gb interfaces. Accordingly, transparency exists between core network 134 of PLMN 132 and the underlying radio access technologies supported by GANC 136, which are different from the radio access supported by BSC 138. As described earlier, WLAN 104 is disposed between generic access (GA)-enabled mobile device 202 and GANC 136 may be effectuated by a suitable broadband IP network (Internet 120). The overall functionality provided by GANC 136 includes user plane circuit-switched (CS) services, user plane packet-switched (PS) services, and control plane functionality. User plane CS services typically involve interworking CS bearers over the Up interface to CS bearers over the A-interface, including appropriate transcoding of voice to/from UE and PCM voice from/to the MSC. The user plane PS services typically involve interworking data transport channels over the Up interface to packet flows over the Gb interface. The control plane functionality typically includes (i) SGW for the set-up of secure tunnel with UE for mutual authentication, encryption and data integrity; (ii) registration for GAN service access and providing system information; (iii) set-up of GAN bearer paths for CS and PS services (e.g. establishment, management, and teardown of signaling and user plane bearers between mobile device 202 and GANC 136); and (iv) GAN functional equivalents to GSM paging and handovers.

Note that mobile device 202 may also be a wireless handset of the dual-mode type, having both WLAN and cellular (WWAN) radio interfaces. Thus, mobile device 202 may access services of core network 134 of PLMN 132 with use of its cellular radio interface, as well as access services via WLANs with use of its WLAN radio interface.

Figure 2:
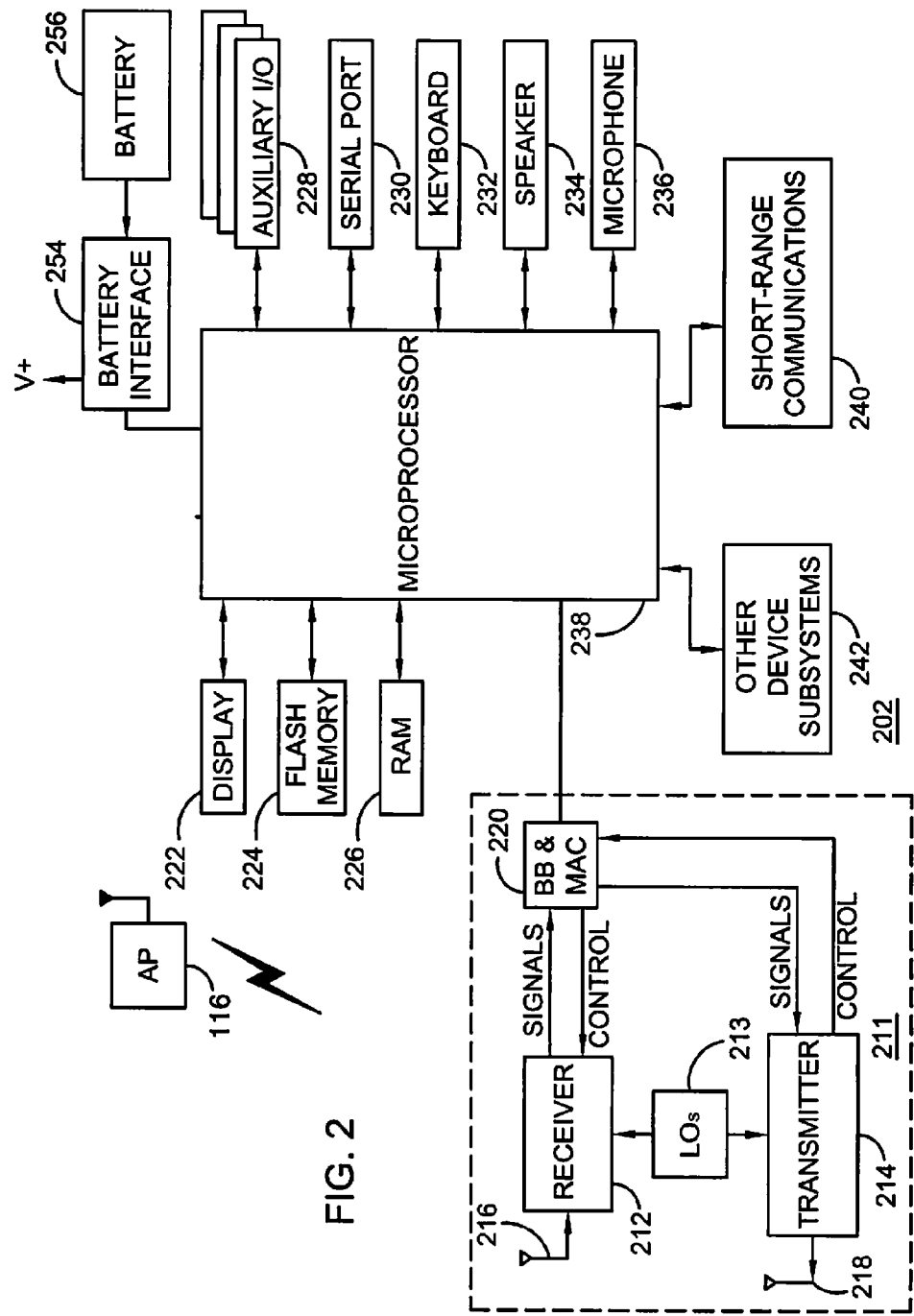
FIG. 2 is a schematic block diagram of the mobile communication device which may operate in the wireless communication network.

Referring now to FIG. 2, electrical components of a typical mobile communication device 202 (e.g. a mobile station) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the communication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including at least data and/or voice communication applications, will normally be installed on mobile device 202 during its manufacture. This includes the inventive techniques of the present disclosure. For this reason, microprocessor 238 may enable execution of a Web browser application (see e.g. the discussion in relation to FIGS. 4-5) with enhanced hotspot-detection capabilities. The techniques of the present disclosure, however, need not be incorporated as part of the Web browser application, as long as outgoing requests and incoming responses are made in accordance with the techniques described in relation to FIGS. 3A-3C (described later below).

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. In accordance with the present techniques, microprocessor 238 may process outgoing message requests and incoming responses described later in relation to FIGS. 3A-3B, whether or not such processing is part of the Web browser application. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 4:
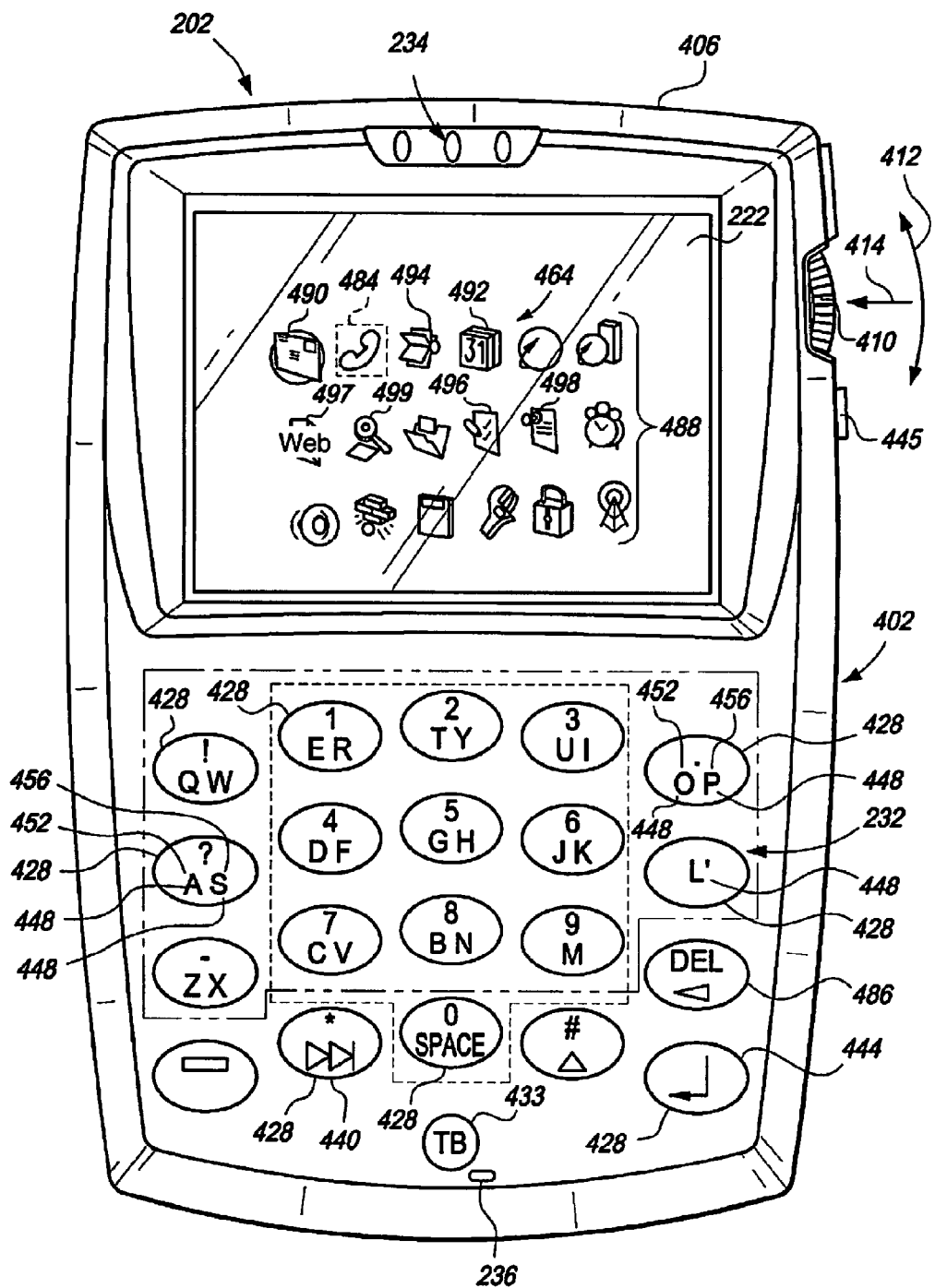
FIG. 4 is an illustrative example of an exemplary user interface of the mobile communication device of FIGS. 1 and 2.

Referring ahead now to FIG. 4, what is shown is an illustrative representation of an exemplary user interface 402 of mobile device 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
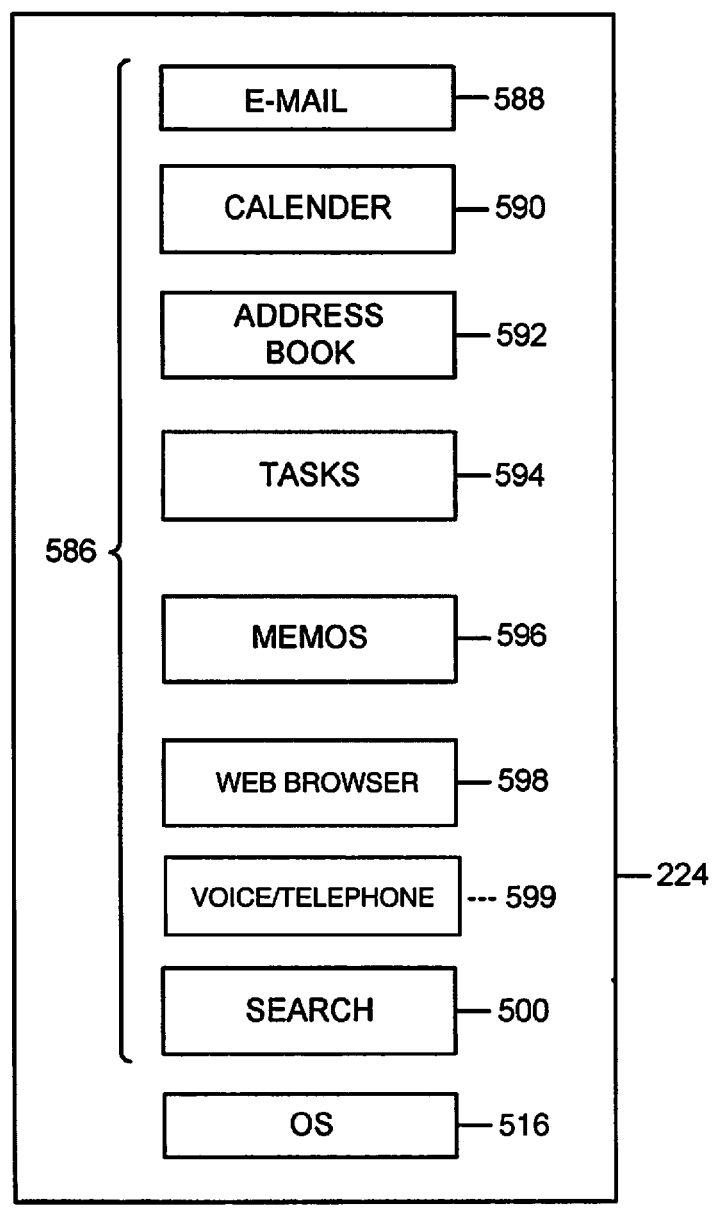
FIG. 5 is an illustrative representation of memory of the mobile communication device which includes a plurality of applications associated with communication services.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the wireless network described is a WLAN, any suitable wireless network may be utilized. The mobile device may additionally or alternatively operate for communications via a cellular telecommunications network (e.g. GSM/GPRS, or CDMA).

Referring back to the environment of FIG. 1, it is noted that mobile device 202 may exit and enter into new and different WLANs during its operation. The new or unknown WLAN may be WLAN 104 which is a "hotspot" (e.g. providing a captive portal), where a user registration or login or other user response will be required prior to mobile device 202 obtaining any useful services via the WLAN hotspot. The "walled garden" of the hotspot prohibits such access. Advantageously, hotspot aggregators have provided a solution for mobile devices to obtain service in a large number of different hotspots. A hotspot may only employ a single SSID, however, and this makes it difficult for mobile devices to identify whether any particular aggregator service is made available in the hotspot. Thus, traditionally, an aggregator provides users with client software to aid in finding and signing in for service. Locally-stored directories of hotspot locations and details have also been provided, requiring some type of network connection for updates. Note however that these existing ways of obtaining service are specific to each particular aggregator, and therefore there is little flexibility for a mobile device to be made aware of and obtain one or more of a variety of different aggregator services in an easy and efficient manner.

In the techniques of the present disclosure, the wireless network may regularly or periodically broadcast one or more aggregator service identifiers. The one or more aggregator service identifiers are associated with one or more aggregators or aggregator services that are made available via the wireless network. For example, each aggregator service identifier may be defined as a new, unique information element (IE) defined in IEEE 802.11 or other relevant standard. Conversely, the wireless network excludes, from its regular broadcasting or other communication, one or more other aggregator service identifiers which identify one or more other aggregator services that are unavailable via the wireless network.

In addition, the mobile device has aggregator service information associated with one or more aggregators or aggregator services stored in its memory (e.g. memory 224 of FIG. 2). To illustrate in relation to FIG. 6, an example of aggregator service information 600 which may be stored in memory of the mobile device is shown. Aggregator service information 600 may include information associated with one or more aggregators. In the embodiment shown, aggregator service information 600 includes information associated with a plurality of different aggregators, such as first aggregator information 602 associated with a first aggregator and second aggregator information 604 associated with a second aggregator. Aggregator service information 600 may be stored in a data table, for example, which may be sorted or otherwise organized by aggregator service identifier.

Figure 6:
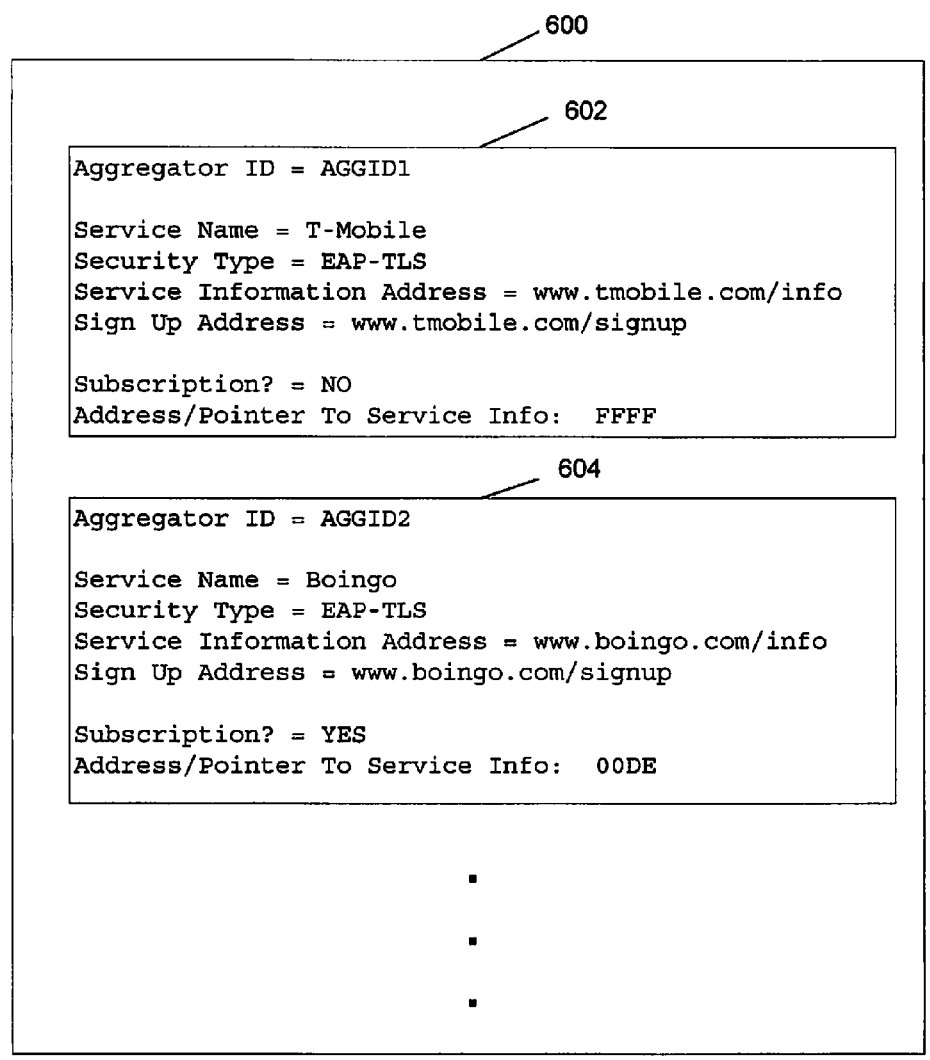
FIG. 6 is an illustrative example of aggregator service information which may be stored in memory of the mobile communication device.

For each aggregator service recognized by the mobile device, aggregator service information 600 may include various information regarding the aggregator or aggregator service. In the example of FIG. 6, aggregator service information 600 may include an aggregator service identifier (or "Aggregator ID") which uniquely identifies the aggregator or aggregator service (e.g. AGGID1 or AGGID2); a service name of the aggregator or aggregator service for display (e.g. T-Mobile or Boingo); a security type for authentication; a first address (e.g. a first URL, such as www.tmobile.com/info or www.boingo.com/info)) associated with a server or server page(s) which provides service information which describes the aggregator service, and perhaps other information such as information regarding subscription, price, and terms; and a second address (e.g. a second URL, such as www.tmobile.com/signup or www.boingo.com/signup) associated with a server or server page(s) for subscribing to the aggregator service.

Aggregator service information 600 may also include an indication (e.g. a bit indication of "0" or "1") or other data stored in the memory which indicates whether a service subscription already exists for the aggregator or aggregator service, or an address or pointer to service information associated with the existing subscription stored in memory of the mobile device. The stored address or pointer may itself be an indication on whether the service subscription already exists for the aggregator or aggregator service.

In one embodiment, the aggregator service information is initially stored in memory during manufacture or dealer configuration of the mobile device. In another embodiment, the aggregator service information is received over-the-air via a wireless network (e.g. WLAN 112 or PLMN 132 of FIG. 1). Once initially obtained, the aggregator service information may be updated over-the-air via a wireless network.

Figure 3A:
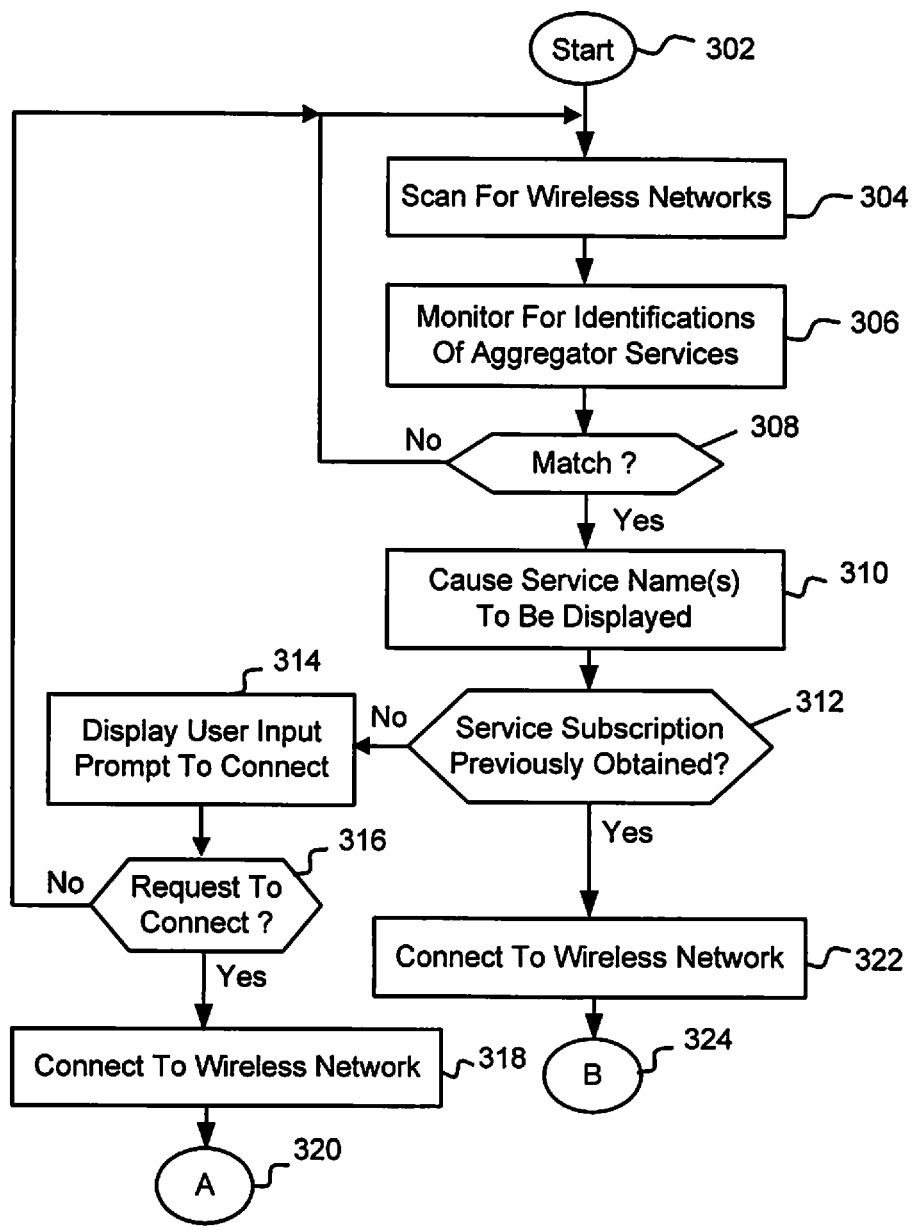

FIGS. 3A, 3B, and 3C form a flowchart of a method for use in facilitating access to aggregator services for mobile communication devices via a wireless communication network. Such technique may overcome prior art deficiencies and other related deficiencies in these and other environments. The method of FIGS. 3A-3C may be performed by the mobile device described in relation to FIGS. 1, 2, 4, and 5. In particular, the techniques described in relation to the flowchart may be performed by one or more controllers or processors of the mobile device along with its wireless transceiver. A computer program product which may embody the technique may include a computer readable medium having computer instructions stored therein which are executable by the one or more processors of the mobile device for performing the technique. In the follow description, the mobile device and wireless network generally operate in accordance with IEEE 802.11 standards, and therefore the appropriate IEEE 802.11 related standards apply where applicable.

Beginning at a start block 302 of FIG. 3A, the controller of the mobile device performs a scanning operation with use of the wireless transceiver to scan for wireless communication networks available in its geographic region (step 304 of FIG. 3A). A wireless network may be identified by a wireless network identifier which may be, in the present WLAN environment, a set service identifier (SSID). Scanning in the WLAN environment may be a passive scan or an active scan. Typically, a wireless network is preferentially selected by the controller in accordance with a list of wireless network profiles stored in the memory.

During the scanning operation, the controller monitors to receive one or more aggregator service identifiers which are broadcasted or otherwise provided by the wireless network (step 306 of FIG. 3A). The controller identifies whether there is a match between each received aggregator service identifier and any one of the stored aggregator service identifiers (step 308 of FIG. 3A). This may be done by comparing the received aggregator service identifier with each one of the stored aggregator service identifiers until a match is found, if at all. If no match is found, the controller may continue back at step 304 for scanning.

If there is a match identified in step 308 of FIG. 3A, then the controller causes the stored service name associated with the aggregator service identifier to be displayed in the visual display of the mobile device (step 310 of FIG. 3A). When a plurality of aggregator services are available, all of the aggregator services may be visually displayed by their service name. Next, the controller identifies whether a service subscription for an aggregator service has been previously obtained for the mobile device (step 312 of FIG. 3A). The controller may perform this step by identifying an indication (e.g. a bit indication of "0" or "1") or other data stored in the memory which indicates whether the service subscription already exists. If the service subscription exists as identified in step 312, then the controller establishes a connection to the wireless network (step 322 of FIG. 3A). This connection may be or include an IP connection in the wireless network. Note that the controller may perform this act even when there is no wireless network profile for the wireless network stored in memory. After step 322, the technique proceeds to a connector "B" 324 which continues in FIG. 3C.

If the service subscription does not exist as identified in step 312, then the controller causes a user input prompt for connecting to the wireless network to be displayed in the visual display (step 316 of FIG. 3A). For example, the controller may display "Wireless Network for BOINGO. Connect <YES> or <NO>?" When a plurality of aggregator services are available, all of the aggregator services may be visually displayed by service name, and the user input prompt may prompt for selection of one of them. If the controller identifies that a request to connect has been received via the user interface (or prompt) (step 316 of FIG. 3A), then the controller establishes a connection to the wireless network (step 318 of FIG. 3A). This connection may be or include an IP connection in the wireless network. If the controller identifies that the request to connect is canceled or timed out in step 316, then the technique may proceed back at step 304 for scanning. After step 318, the technique proceeds to a connector "A" 320 which continues in FIG. 3B. In an alternate embodiment, steps 314 and 316 are not performed, and instead step 318 is performed in response to the outcome in step 312.

Continuing with connector "A" 320 in FIG. 3B, for the case where the mobile device did not have a subscription, the controller causes a solicitation for subscribing to the aggregator service to be displayed in the visual display (step 328 of FIG. 3B). The solicitation may include or be followed by one or more user input prompts for obtaining service information and/or subscribing to the aggregator service. For example, the solicitation may read as JOIN BOINGO NOW
Click Here To Subscribe <O>
Click Here For More Information <O>

As part of the solicitation, the controller may further provide a server address or server page address for obtaining service information regarding the aggregator service, as well as a server address or server page address for subscribing to the aggregator service (step 330 of FIG. 3B). The addresses may be, may be part of, or may be associated with, the user input prompts. In one embodiment, the addresses are or are provided as a uniform resource locator or "URL", a hypertext link, or both. The addresses are provided to and read by the controller from the aggregator service information associated with the identified aggregator service. The addresses may identify a server that is external to the wireless network, such as a server in the aggregator service network (e.g. server 160 in FIG. 1). The gateway of the wireless network (e.g. gateway 110 of FIG. 1) may have a table of allowable external server addresses stored in memory, which includes these addresses for access. As an alternative, the mobile device may access the server and information via an alternative network (e.g. via a cellular network, such as through base stations 140, 142 of PLMN 132 of FIG. 1). Note further that the display and use of information in step 330 may be performed locally without the need to access information external from the wireless network.

If the controller receives, via the user input prompt, a request for the service information (step 332 of FIG. 3B), then the controller causes a corresponding request to be sent to the server for the receipt of the service information to be displayed in the visual display (step 340 of FIG. 3B). The service information may describe the aggregator service, and provide other related details such as service advantages, subscription packages, prices for subscription package, and terms of the subscription. The request in step 332 may be or include one or more Hypertext Transfer Protocol (HTTP) requests, such as HTTP GET requests, for obtaining information from the server. The response which includes the information may be transcoded or formatted at the server (or other associated server) to optimize viewing at the mobile device.

On the other hand, if the controller receives via the user input prompt a request for obtaining a subscription to the aggregator service (step 334 of FIG. 3B), then the controller causes a corresponding request to be sent to the server for the receipt of subscription information to be displayed in the visual display (step 342 of FIG. 3B). As in step 332, the request in step 334 may be or include one or more HTTP requests, such as HTTP GET requests, for obtaining information from the server. Again, the response which includes the information may be transcoded or formatted at the server (or other associated server) to optimize viewing at the mobile device. In response to further user input, the controller causes a request for the mobile device to subscribe to the aggregator service to be sent to the server (step 344 of FIG. 3B). In response to further user input, the controller also causes user information and user payment information to be sent from the mobile device to the server (step 346 of FIG. 3B).

If the subscription information which includes the user payment information is confirmed (step 348 of FIG. 3B), then the subscription for the aggregator service is successfully enabled or activated for the mobile device; otherwise the subscription is canceled where the flowchart ends at an end block 338. When a subscription is enabled or activated, subscription or service information for accessing the aggregator service may be received (step 350 of FIG. 3B). For example, user credentials for accessing the aggregator service may be received. In addition, or alternatively, for example, if a local application needs to be received and installed in mobile device for accessing the aggregator service, the application may be received and installed in the mobile device at this time.

The information for accessing the aggregator service may be received in a number of different ways. In one embodiment, the information is received by the mobile device via the wireless network in a communication from the server or aggregator network during or after the subscription process. This could be done, for example, by sending the information to the mobile device a communication in accordance with wireless access protocol (WAP). In another embodiment, the information may be received in an "out-of-band" or different channel than that utilized by the mobile device in the wireless network (e.g. via short message service or "SMS" text message or via a cellular telecommunications network).

The flowchart then proceeds through to connector "B" 324 to step 354 of FIG. 3C, after step 322 of FIG. 3A or after step 350 of FIG. 3B. In this embodiment, proper authentication in the aggregator network is needed and utilized for accessing or obtaining the aggregator service. Thus, the controller of the mobile device causes a user input prompt for credentials to be displayed in the visual display (step 354 of FIG. 3C). In response, the controller receives the credentials via the user input prompt from the user (step 356 of FIG. 3C). In response, the controller causes the credentials to be sent via the wireless network to the aggregator network for authentication (step 358 of FIG. 3C). In one embodiment, steps 354 and 356 are not performed but rather the credentials (once initially received) are stored in association with the aggregator service identifier in the memory and automatically submitted by the mobile device (without user intervention or entry of the credentials). In either case, a response from the aggregator network is then received via the wireless network (step 360 of FIG. 3C). The response may indicate a success (i.e. the credentials have been successfully authenticated) or a failure (i.e. the credentials have been authenticated unsuccessfully). If the response indicates a failure, then the process repeats again starting at step 354.

If the response indicates a success at step 362, then the mobile device has successfully obtained the aggregator service via the wireless network (step 364 of FIG. 3C). External access outside of the wireless network is permitted, and the type of access and service will depend on the type of service provided by the aggregator service.

The controller then identifies whether the mobile device has a wireless network profile associated with the chosen wireless network in its stored list of wireless network profiles, as identified by its wireless network identifier (step 366 of FIG. 3C). If there is no existing profile for the wireless network as identified in step 366, the controller creates a new wireless network profile associated with the wireless network and stores it in memory with the other wireless network profiles of the list (step 368 of FIG. 3C). If the wireless network profile already exists in the list as identified in step 366, there is no need to perform step 368. Thus, the controller operates to dynamically "build" its list of wireless network profiles in memory based on the aggregator service and the geographic region through which the mobile device has traversed. The building of wireless network profiles may become automatic (without user intervention, entry, or selection), once the subscription for the aggregator service has been obtained.

In either case then, the controller performs operations to facilitate communications using the aggregator service (step 370 of FIG. 3C). Again, the type of access and service will depend on the type of service provided by the aggregator service. The server(s) of the aggregator service (e.g. one or more servers 160) may provide or otherwise facilitate the aggregator service for the mobile device; this may include the performing of functions such as providing the service, monitoring the service for quality, monitoring the service for billing, providing service information, etc.

When the quality of the communications with the wireless network become poor or lost (e.g. due to roaming of the mobile device), the method repeats again starting at the start block 302 of FIG. 3A.

Thus, methods and apparatus for use in facilitating access to aggregator services via wireless communication networks have been described. In one illustrative example, a wireless local area network (WLAN) regularly broadcasts or otherwise communicates one or more aggregator service identifiers which identify one or more aggregator services made available via the WLAN. Each aggregator service identifier may be defined as a new, unique information element (IE) in IEEE 802.11 or other relevant standard. On the other hand, the WLAN excludes, from its regular broadcasting or other communications, one or more other aggregator service identifiers which identify one or more other aggregator services that are unavailable via the WLAN.

In addition, a mobile communication device has a memory for storing aggregator service information. During operation, the mobile device performs a scanning operation to identify WLANs and receives, from the scanning operation, the one or more aggregator service identifiers from the WLAN. The mobile device compares a received aggregator service identifier with one or more stored aggregator service identifiers of the aggregator service information. When there is a match between the received and the stored aggregator service identifiers, the mobile device may connect with and receive the aggregator service via the WLAN. For newly-encountered WLANs, the mobile device may also automatically create and store a wireless network profile associated with the WLAN that provides the aggregator service. For each aggregator or aggregator service, the aggregator service information may include a service name of the aggregator or aggregator service, a security type for authentication, a first URL for obtaining service information for the aggregator service, and a second URL for subscribing to the aggregator service, all of which may be displayed or otherwise utilized for obtaining service.

The above-described embodiments of the present disclosure are intended to be examples only. Those of skill in the art may affect alterations, modifications and variations to the particular embodiments without departing from the scope of the application. Although the description of the architecture for FIG. 1 relates to a specific example for illustration, where the WLAN is an IEEE 802.11-based network, different environments may be applicable as well. The wireless network may be a Bluetooth-based network, a WiMAX-based network (i.e. IEEE 802.16), or an Ultra-WideBand (UWB)-based network (i.e. IEEE 802.15), as a few examples. The invention described herein in the recited claims intends to cover and embrace all suitable changes in technology.

What is claimed is:

1. A method comprising:
at a device comprising a processor, a radio frequency (RF) transceiver and a memory,
receiving, at the processor, using the RF transceiver, a hotspot aggregator service identifier, transmitted by a hotspot of a wireless network, which identifies a hotspot aggregator service made available using the wireless network, the hotspot aggregator service associated with a plurality of aggregator network identifiers identifying respective aggregator networks, the respective aggregator networks providing network services from a plurality of network service providers;
comparing, at the processor, the hotspot aggregator service identifier with hotspot aggregator service information stored in the memory in association with respective information of whether a respective service subscription already exists for a respective hotspot aggregator service; and
when the hotspot aggregator service identifier matches the hotspot aggregator service information, and when the respective information stored in the memory indicates that a service subscription already exists for the hotspot aggregator service identified by the hotspot aggregator service identifier, initiating, at the processor, authentication to the respective hotspot aggregator service using the RF transceiver by: setting up a tunnel through the hotspot between the device and an aggregator authentication server; and authenticating the device with the aggregator authentication server.

2. The method of claim 1, further comprising, when the hotspot aggregator service identifier matches the hotspot aggregator service information, and when the respective information stored in the memory indicates that the service subscription does not exist for the hotspot aggregator service identified by the hotspot aggregator service identifier, providing, at the device, information for signing up to the hotspot aggregator service.

3. The method of claim 1, further comprising, when the hotspot aggregator service identifier matches the hotspot aggregator service information, and when the respective information stored in the memory indicates that the service subscription does not exist for the hotspot aggregator service identified by the hotspot aggregator service identifier, providing, at the device, payment information for signing up to the hotspot aggregator service.

4. The method of claim 1, further comprising, when the hotspot aggregator service identifier matches the hotspot aggregator service information, and when the respective information stored in the memory indicates that the service subscription does not exist for the hotspot aggregator service identified by the hotspot aggregator service identifier, initiating, at the processor, signing up to the hotspot aggregator service.

5. The method of claim 1, further comprising, when the hotspot aggregator service identifier matches the hotspot aggregator service information, and when the respective information stored in the memory indicates that the service subscription does not exist for the hotspot aggregator service identified by the hotspot aggregator service identifier: transmitting, using the RF transceiver, a request to sign up to the hotspot aggregator service; and receiving, using the RF transceiver, information for signing up to the hotspot aggregator service.

6. The method of claim 1, further comprising: transmitting, using the RF transceiver, credentials to a server of the hotspot aggregator service identified by the hotspot aggregator service identifier, to obtain authorization for receiving the hotspot aggregator service.

7. The method of claim 1, wherein the receiving the hotspot aggregator service identifier comprises receiving an associated network address for signing up to the hotspot aggregator service.

8. The method of claim 1, further comprising identifying a plurality of wireless networks each providing an associated hotspot aggregator service.

9. The method of claim 1, wherein the wireless network comprises a wireless local area network (WLAN) operative in accordance with IEEE 802.11.

10. A device comprising:
a processor, a radio frequency (RF) transceiver and a memory, the processor configured to:
receive, using the RF transceiver, a hotspot aggregator service identifier, transmitted by a hotspot of a wireless network, which identifies a hotspot aggregator service made available using the wireless network, the hotspot aggregator service associated with a plurality of aggregator network identifiers identifying respective aggregator networks, the respective aggregator networks providing network services from a plurality of network service providers;
compare the hotspot aggregator service identifier with hotspot aggregator service information stored in the memory in association with respective information of whether a respective service subscription already exists for a respective hotspot aggregator service; and
when the hotspot aggregator service identifier matches the hotspot aggregator service information, and when the respective information stored in the memory indicates that a service subscription already exists for the hotspot aggregator service identified by the hotspot aggregator service identifier, initiate authentication to the hotspot respective hotspot aggregator service using the RF transceiver by: setting up a tunnel through the hotspot between the device and an aggregator authentication server; and authenticating the device with the aggregator authentication server.

11. The device of claim 10, wherein the processor is further configured to, when the hotspot aggregator service identifier matches the hotspot aggregator service information, and when the respective information stored in the memory indicates that the service subscription does not exist for the hotspot aggregator service identified by the hotspot aggregator service identifier, provide information for signing up to the hotspot aggregator service.

12. The device of claim 10, wherein the processor is further configured to, when the hotspot aggregator service identifier matches the hotspot aggregator service information, and when the respective information stored in the memory indicates that the service subscription does not exist for the hotspot aggregator service identified by the hotspot aggregator service identifier, provide payment information for signing up to the hotspot aggregator service.

13. The device of claim 10, wherein the processor is further configured to, when the hotspot aggregator service identifier matches the hotspot aggregator service information, and when the respective information stored in the memory indicates that the service subscription does not exist for the hotspot aggregator service identified by the hotspot aggregator service identifier, initiate, at the processor, signing up to the hotspot aggregator service.

14. The device of claim 10, wherein the processor is further configured to, when the hotspot aggregator service identifier matches the hotspot aggregator service information, and when the respective information stored in the memory indicates that the service subscription does not exist for the hotspot aggregator service identified by the hotspot aggregator service identifier: transmit, using the RF transceiver, a request to sign up to the hotspot aggregator service; and receive, using the RF transceiver, information for signing up to the hotspot aggregator service.

15. The device of claim 10, wherein the processor is further configured to: transmit, using the RF transceiver, credentials to a server of the hotspot aggregator service identified by the hotspot aggregator service identifier, to obtain authorization for receiving the hotspot aggregator service.

16. The device of claim 10, wherein the processor is further configured to receive the hotspot aggregator service identifier by receiving an associated network address for signing up to the hotspot aggregator service.

17. The device of claim 10, wherein the processor is further configured to identify, using the RF transceiver, a plurality of wireless networks each providing an associated hotspot aggregator service.

18. The device of claim 10, wherein the wireless network comprises a wireless local area network (WLAN) operative in accordance with IEEE 802.11.

19. The device of claim 10, further comprising a mobile device.

20. A non-transitory computer-readable medium storing a computer program, wherein execution of the computer program is for:
at a device comprising a processor, a radio frequency (RF) transceiver and a memory, receiving, at the processor, using the RF transceiver, a hotspot aggregator service identifier, transmitted by a hotspot of a wireless network, which identifies a hotspot aggregator service made available using the wireless network, the hotspot aggregator service associated with a plurality of aggregator network identifiers identifying respective aggregator networks, the respective aggregator networks providing network services from a plurality of network service providers;
comparing, at the processor, the hotspot aggregator service identifier with hotspot aggregator service information stored in the memory in association with respective information of whether a respective service subscription already exists for a respective hotspot aggregator service; and when the hotspot aggregator service identifier matches the hotspot aggregator service information, and when the respective information stored in the memory indicates that a service subscription already exists for the hotspot aggregator service identified by the hotspot aggregator service identifier, initiating, at the processor, authentication to the hotspot respective hotspot aggregator service using the RF transceiver by: setting up a tunnel through the hotspot between the device and an aggregator authentication server; and authenticating the device with the aggregator authentication server.

* * * * *